US007500357B2

(12) United States Patent
Chaouche et al.

(10) Patent No.: US 7,500,357 B2
(45) Date of Patent: Mar. 10, 2009

(54) SYSTEM FOR ASSISTING REGENERATION OF A STORAGE/RELEASE NOX TRAP FOR A MOTOR VEHICLE DIESEL ENGINE

(75) Inventors: Ali Chaouche, Paris (FR); Djamal Medioun, Colombes (FR); Yvon Beauge, Rungis (FR); Piet Ameloot, Neuilly sur Seine (FR); Mickael Gascoin, Colombes (FR)

(73) Assignee: Peugeot Citron Automobiles SA, Velizy-Villacoublay (FR)

( * ) Notice: Subject to any disclaimer, the term of this patent is extended or adjusted under 35 U.S.C. 154(b) by 51 days.

(21) Appl. No.: 10/532,229

(22) PCT Filed: Oct. 14, 2003

(86) PCT No.: PCT/FR03/03025

§ 371 (c)(1),
(2), (4) Date: Oct. 24, 2005

(87) PCT Pub. No.: WO2004/038205

PCT Pub. Date: May 6, 2004

(65) Prior Publication Data

US 2006/0107652 A1      May 25, 2006

(30) Foreign Application Priority Data

Oct. 23, 2002   (FR)   .................................. 02 13256

(51) Int. Cl.
*F01N 3/00*   (2006.01)
(52) U.S. Cl. .............................. 60/295; 60/274; 60/278; 60/285; 60/301

(58) Field of Classification Search .................. 60/278, 60/285, 286, 295, 301, 274
See application file for complete search history.

(56) References Cited

U.S. PATENT DOCUMENTS 5,775,099 A * 7/1998 Ito et al. ........................ 60/286
6,082,325 A    7/2000 Digeser et al.

(Continued)

FOREIGN PATENT DOCUMENTS

DE       199 23 299 A1    11/2000

(Continued)

OTHER PUBLICATIONS

European Patent Office, Patent Abstracts of Japan, Publication No. 2000018074, dated Jan. 18, 2000.

*Primary Examiner*—Thomas E Denion
*Assistant Examiner*—Diem Tran
(74) *Attorney, Agent, or Firm*—Nicolas E. Seckel

(57) ABSTRACT

A system for assisting regeneration of a storage/release NOx trap integrated in an exhaust line (5) of a motor vehicle diesel engine (4) is characterized in that it comprises gas admission means for admitting gas into the engine, means for injecting fuel (11) into the cylinders thereof in the form of at least pilot and main injections, and means for controlling (12) said gas admission and/or fuel injection means for periodically switching the engine (4) between a lean-mixture standard operating mode in which NOx is stored in the trap (6) and a rich-mixture regeneration operating mode, with at least two pilot injections (1, 2) and one main injection (3), in which NOx is released from the trap (6) and the trap is regenerated.

20 Claims, 2 Drawing Sheets

U.S. PATENT DOCUMENTS

| | | | |
|---|---|---|---|
| 6,171,565 B1 * | 1/2001 | Hohne et al. | 423/239.1 |
| 6,240,721 B1 * | 6/2001 | Ito et al. | 60/274 |
| 6,378,297 B1 * | 4/2002 | Ito et al. | 60/284 |
| 6,412,276 B1 | 7/2002 | Salvat et al. | |
| 6,491,016 B1 * | 12/2002 | Buratti | 123/299 |
| 6,536,209 B2 * | 3/2003 | Fluga et al. | 60/284 |
| 6,666,020 B2 * | 12/2003 | Tonetti et al. | 60/286 |
| 6,901,747 B2 * | 6/2005 | Tashiro et al. | 60/286 |

FOREIGN PATENT DOCUMENTS

| | | |
|---|---|---|
| EP | 1 035 315 A2 | 9/2000 |

* cited by examiner

SYSTEM FOR ASSISTING REGENERATION OF A STORAGE/RELEASE NOX TRAP FOR A MOTOR VEHICLE DIESEL ENGINE

The present invention relates to a system for reducing pollutant emissions associated with the operation of a motor vehicle diesel engine, and more particularly to a system for assisting regeneration of a storage/release NOx trap integrated into an engine exhaust line.

BACKGROUND OF THE INVENTION

With direct injection diesel engines for motor vehicles, reducing NOx emissions by storage/release DeNOx catalysis is one technical solution envisaged for compliance with the standards relating to this type of pollution, and in particular the EURO IV standards.

To this end, it is envisaged to use a NOx trap adapted to absorb NOx during standard operation of the engine and consisting of barium sulfate, for example.

It is proposed to trigger a transient release stage when the trap is saturated by momentarily switching the engine from the standard mode of operation with a lean mixture to a regeneration mode of operation with a rich mixture in order to produce reducing agents, for example HC and CO, that reduce the NOx, which is then desorbed from the trap, as in a conventional catalytic converter.

However, that causes problems with stable control of the operation of the engine when using a rich mixture over the whole of its range of operation without impacting on driver comfort, combustion noise, etc.

SUMMARY OF THE INVENTION

The object of the invention is therefore to solve the above problems.

To this end, the invention consists in a system for assisting regeneration of a storage/release NOx trap integrated in an exhaust line of a motor vehicle diesel engine, the system being characterized in that it comprises gas admission means for admitting gas into the engine, means for injecting fuel into the cylinders thereof in the form of at least pilot and main injections, and means for controlling said gas admission and/or fuel injection means for periodically switching the engine between a lean-mixture standard operating mode in which NOx is stored in the trap and a rich-mixture regeneration operating mode, with at least two pilot injections and one main injection, in which NOx is released from the trap and the trap is regenerated.

According to other features of the invention:
  the control means are adapted to control the gas admission means to reduce the quantity of gas admitted into the engine when said engine is in its regeneration mode of operation;
  the control means are adapted to control the gas admission means and/or the fuel injection means in accordance with the standard and regeneration modes of operation for engine loads below a predetermined threshold value;
  the predetermined load threshold value is defined by a brake mean effective pressure (bmep) of approximately 3 bars;
  the engine is associated with exhaust gas recirculation means for recirculating exhaust gas to its inlet, and the control means are adapted to regulate the operation of the recirculation means during operation of the engine with a rich mixture;
  the two pilot injections are triggered in a crankshaft angle range from approximately 50° to approximately 5° ahead of the top dead centre point of the cylinder concerned and the main injection is triggered in an under-calibrated range up to a crankshaft angle of approximately 35° after the top dead centre point;
  the control means are adapted to control the gas admission means and/or the injection means to operate the engine with a lean mixture for approximately 60 seconds and a rich mixture for approximately 2 seconds.

BRIEF DESCRIPTION OF THE DRAWINGS

The invention will be better understood on reading the following description, which is given by way of example only and with reference to the appended drawings, in which.

DETAILED DESCRIPTION OF PARTICULAR EMBODIMENTS

As indicated above, the invention relates to a system for assisting regeneration of a storage/release NOx trap integrated in an exhaust line of a motor vehicle diesel engine.

Figure 1:
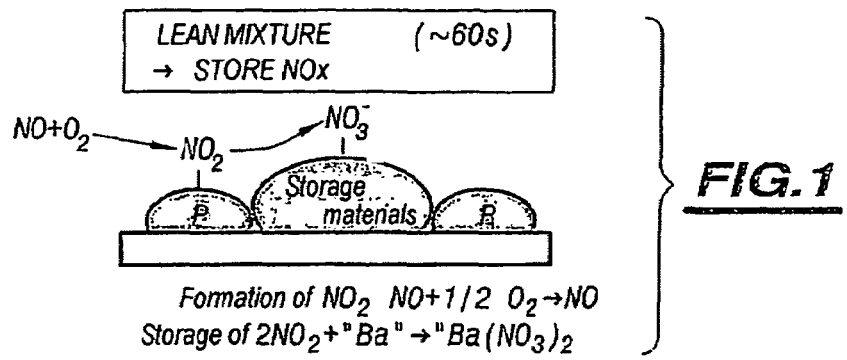
FIGS. 1 and 2 show the NOx storage and release stages in a trap included in a system of the invention.
Figure 2:
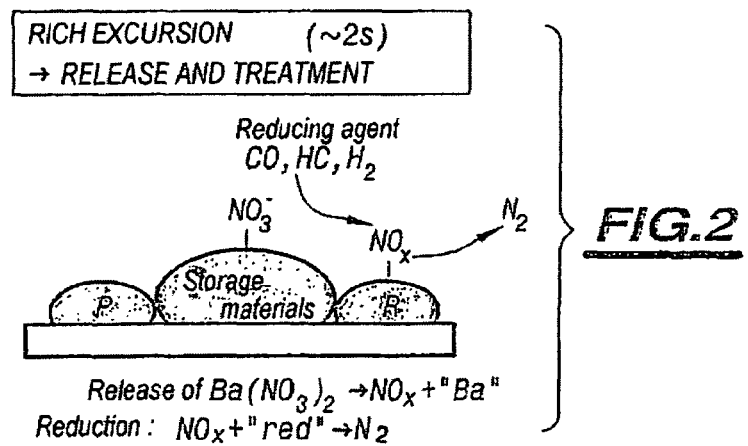

FIGS. 1 and 2 show the storage and release stages.

As also indicated, the NOx trap absorbs NOx during standard operation of the engine with a lean mixture, whereas in a regeneration mode of operation with a rich mixture NOx is released and treated by producing reducing agents such as HC and CO, that reduce NOx, which is then desorbed from the trap as in a conventional catalytic converter.

However, and as indicated above, this leads to the problem of stable operation of a diesel engine when using a rich mixture over the whole of the engine range without impacting on driver comfort, combustion noise, etc.

Switching to a stoichiometric or rich mixture is necessary for purging the NOx trap, and also for desulfating it, as sulfur in the fuel poisons the trap.

This operation takes longer than purging, which takes only a few seconds, and is therefore even more difficult to manage.

Under such circumstances, assisting the regeneration of a storage/release NOx trap necessitates the development of a specific multiple injection strategy applicable over the whole of the engine range and based on a plurality of engine parameters.

The injection strategy must:
  enable operation at a richness close to 1;
  produce CO in sufficient quantities, since this is the preferred reducing agent;
  limit the level of $O_2$;
  limit the level of HC;
  conform to smoke level criteria;
  conform to exhaust gas temperature criteria for reasons of mechanical strength; and, finally
  conform to criteria in respect of services provided to end users, namely driver comfort and engine operating noise.

Figure 3:
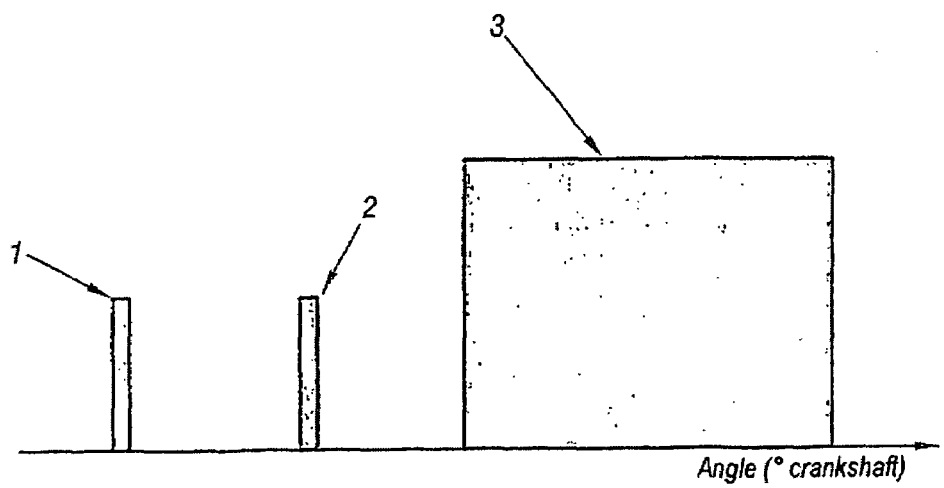
FIG. 3 shows the operation of fuel injection means used in a system of the invention.

To this end, the present invention proposes to improve the stability and noise characteristics of combustion at predetermined load points of the engine by applying an injection strategy employing two pilot injections and one main injection, as shown in FIG. 3.

Applying the two pilot injections retards the main injection to satisfy the criteria of NOx trap regeneration.

Moreover, exhaust gas recirculation (EGR) can be regulated to conform to the NOx trap regeneration criteria over all these points.

At the predetermined load points, for example for a brake mean effective pressure (bmep) less than about 3 bars, the strategy employing two pilot injections therefore satisfies the NOx trap regeneration criteria, since it significantly reduces combustion instabilities at those points, because of the phasing of the two pilot injections, reduces noise, also because of the phasing of the two pilot injections, retards the main injection, and finally generates an engine map for regeneration of the NOx trap based on a unique strategy.

As indicated above, that strategy may be applied at predetermined operating load points of the engine, to regulate EGR.

This is represented in FIG. 3, which shows the two pilot injections 1 and 2 and the main injection 3.

The two pilot injections can be triggered in a crankshaft angle range from approximately 50° to approximately 5° ahead of the top dead centre point of the cylinder concerned, and the main injection can be triggered in an undercalibrated range up to a crankshaft angle of approximately 35° after the top dead centre point.

Figure 4:
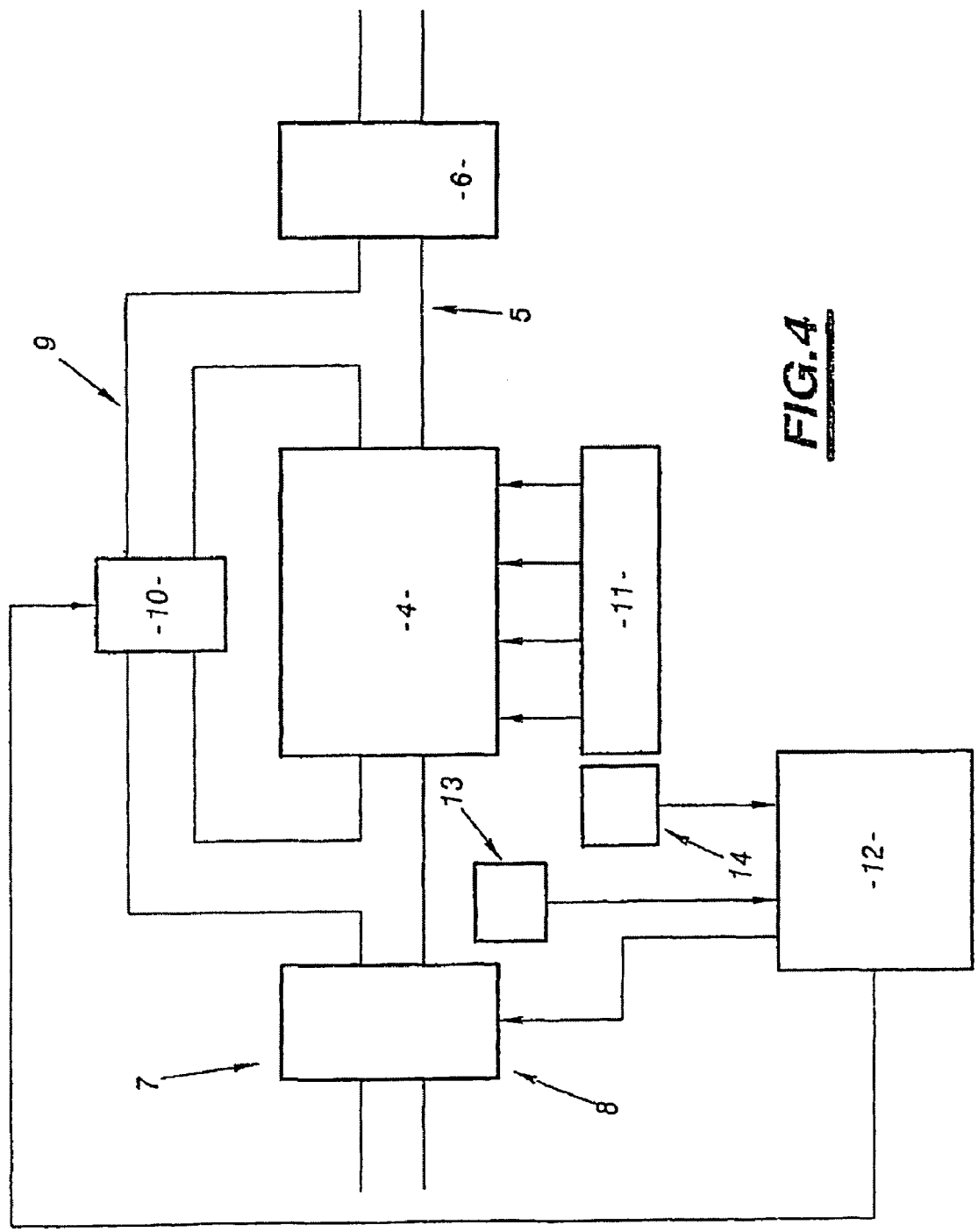
FIG. 4 is a block diagram of the structure of a system of the invention.

FIG. 4 shows a motor vehicle diesel engine 4 whose outlet is connected to an exhaust line 5 in which a NOx trap 6 is integrated.

The engine is also associated with air admission means 7 including means 8 for adjusting the quantity of air admitted.

The engine is also associated with means 9 for recirculating exhaust gases to its inlet associated with means 10 for controlling the circulation of the gas.

The exhaust gas recirculation (EGR) means are therefore connected between the outlet and the inlet of the engine to recirculate the exhaust gases.

The adjustment means 8 and the control means 10 can comprise valves in the conventional way.

The engine is also associated with means 11 for injecting fuel into its cylinders in the form of pilot injections and main injections, as already indicated, such means having any appropriate structure.

The various means, i.e. the exhaust gas recirculation means, the air admission means and the injection means, are controlled by control means 12 comprising any appropriate computer receiving as input, for example, engine rotation speed information and injection pressure information from corresponding data acquisition means 13 and 14, respectively.

The control means 11 may periodically switch between the standard operating mode with a lean mixture that stores NOx in the trap and the regeneration mode of operation with a rich mixture that releases NOx from the trap and thereby regenerates the trap, the engine 4 operating with a lean mixture for approximately 60 seconds and a rich mixture for approximately 2 seconds, for example. The control means 12 then operate on the air admission means 7 for admitting air into the engine 4 and the injection means 11 for injecting fuel into its cylinders, to switch the engine periodically from the lean-mixture standard mode of operation to the rich-mixture regeneration mode of operation.

The control means 12 may be adapted to control the gas admission means in order to reduce the quantity of gas admitted into the engine when it is in its regeneration operating mode and to control the injection means in the manner indicated above.

The control means can also be adapted to regulate the operation of the exhaust gas recirculation means 9 when the engine is operating with the rich mixture.

Other embodiments can be envisaged, of course.

The invention claimed is:

1. A system for assisting regeneration of a storage/release NOx trap integrated in an exhaust line of a motor vehicle diesel engine, the system comprising gas admission means for admitting gas into the engine, means for injecting fuel into the cylinders thereof in the form of at least pilot and main injections, and means for controlling at least one of (i) said gas admission means and (ii) said fuel injection means for periodically switching the engine between a lean mixture standard operating mode in which NOx is stored in the trap and a rich mixture regeneration operating mode in which NOx is released from the trap and the trap is regenerated, wherein, in the rich-mixture regeneration operating mode, the injection means are suitable for implementing at least two pilot injections triggered in a crankshaft angle range from approximately 50° to approximately 5° ahead of the top dead centre point of the cylinder concerned, and the main injection is triggered in an undercalibrated range up to a crankshaft angle of approximately 35° after the top dead centre point, wherein the control means are adapted to control at least one of (i) the gas admission means and (ii) the fuel injection means in accordance with the standard and regeneration modes of operation for engine loads below a predetermined threshold value.

2. A system according to claim 1, wherein the control means are adapted to control at least one of (i) the gas admission means and (ii) the injection means to operate the engine with a lean mixture for approximately 60 seconds and a rich mixture for approximately 2 seconds.

3. A system according to claim 1, wherein, in the rich-mixture regeneration operating mode, the injection means are suitable for implementing a series of injections consisting of (i) a plurality of pilot injections comprising at least two pilot injections triggered in a crankshaft angle range from approximately 50° to approximately 5° ahead of the top dead centre point of the cylinder concerned and (ii) a single main injection triggered in an undercalibrated range up to a crankshaft angle of approximately 35° after the top dead centre point.

4. A system according to claim 1, wherein the control means are adapted to control the gas admission means to reduce the quantity of gas admitted into the engine when said engine is in its regeneration mode of operation.

5. A system according to claim 4, wherein the control means are adapted to control at least one of (i) the gas admission means and (ii) the injection means to operate the engine with a lean mixture for approximately 60 seconds and a rich mixture for approximately 2 seconds.

6. A system according to claim 4, wherein the predetermined load threshold value is defined by a brake mean effective pressure of approximately 3 bars.

7. A system according to claim 6, wherein the engine is associated with exhaust gas recirculation means for recirculating exhaust gas to its inlet, and the control means are adapted to regulate the operation of the recirculation means during operation of the engine with a rich mixture.

8. A system according to claim 6, wherein the control means are adapted to control at least one of (i) the gas admission means and (ii) the injection means to operate the engine with a lean mixture for approximately 60 seconds and a rich mixture for approximately 2 seconds.

9. A system according to claim 7, wherein the control means are adapted to control at least one of (i) the gas admission means and (ii) the injection means to operate the engine with a lean mixture for approximately 60 seconds and a rich mixture for approximately 2 seconds.

10. A system according to claim 4, wherein the engine is associated with exhaust gas recirculation means for recirculating exhaust gas to its inlet, and the control means are adapted to regulate the operation of the recirculation means during operation of the engine with a rich mixture.

11. A system according to claim 10, wherein the control means are adapted to control at least one of (i) the gas admission means and (ii) the injection means to operate the engine with a lean mixture for approximately 60 seconds and a rich mixture for approximately 2 seconds.

12. A system according to claim 1, wherein the predetermined load threshold value is defined by a brake mean effective pressure of approximately 3 bars.

13. A system according to claim 12, wherein the control means are adapted to control at least one of (i) the gas admission means and (ii) the injection means to operate the engine with a lean mixture for approximately 60 seconds and a rich mixture for approximately 2 seconds.

14. A system according to claim 12, wherein the engine is associated with exhaust gas recirculation means for recirculating exhaust gas to its inlet, and the control means are adapted to regulate the operation of the recirculation means during operation of the engine with a rich mixture.

15. A system according to claim 14, wherein the control means are adapted to control at least one of (i) the gas admission means and (ii) the injection means to operate the engine with a lean mixture for approximately 60 seconds and a rich mixture for approximately 2 seconds.

16. A system according to claim 1, wherein the engine is associated with exhaust gas recirculation means for recirculating exhaust gas to its inlet, and the control means are adapted to regulate the operation of the recirculation means during operation of the engine with a rich mixture.

17. A system according to claim 16, wherein the control means are adapted to control at least one of (i) the gas admission means and (ii) the injection means to operate the engine with a lean mixture for approximately 60 seconds and a rich mixture for approximately 2 seconds.

18. A method of assisting regeneration of a storage/release NOx trap integrated in an exhaust line of a motor vehicle diesel engine, comprising:
  admitting gas into the engine,
  injecting fuel into the cylinders thereof in the form of at least pilot and main injections, and
  controlling at least one of (i) said gas admission and (ii) said fuel injection for periodically switching the engine between a lean mixture standard operating mode in which NOx is stored in the trap and a rich mixture regeneration operating mode in which NOx is released from the trap and the trap is regenerated, for engine loads below a predetermined threshold value,
  wherein said method further comprises, in the rich-mixture regeneration operating mode,
  triggering at least two pilot injections in a crankshaft angle range from approximately 50° to approximately 5° ahead of the top dead centre point of the cylinder concerned, and
  triggering the main injection in an undercalibrated range up to a crankshaft angle of approximately 35° after the top dead centre point.

19. A method according to claim 18, wherein the control step comprises controlling the gas admission to reduce the quantity of gas admitted into the engine when said engine is in its regeneration mode of operation.

20. A method according to claim 18, comprising recirculating exhaust gas to an inlet of the engine, and regulating the operation of the recirculation step during operation of the engine with a rich mixture.

* * * * *